United States Patent
Kagawa et al.

(10) Patent No.: US 7,315,400 B2
(45) Date of Patent: Jan. 1, 2008

(54) IMAGE PROCESSING APPARATUS AND IMAGE PROCESSING METHOD

(75) Inventors: Hidetsugu Kagawa, Kanagawa (JP); Tatsuo Kimura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 687 days.

(21) Appl. No.: 10/958,581

(22) Filed: Oct. 5, 2004

(65) Prior Publication Data
US 2005/0088696 A1  Apr. 28, 2005

(30) Foreign Application Priority Data
Oct. 9, 2003  (JP) .............................. 2003-351302

(51) Int. Cl.
*H04N 1/40* (2006.01)
*G06K 1/00* (2006.01)

(52) U.S. Cl. ........................................ 358/2.1; 358/1.9

(58) Field of Classification Search ................. 358/1.9, 358/2.1, 3.02, 3.1, 504, 462, 3.06
See application file for complete search history.

(56) References Cited

U.S. PATENT DOCUMENTS 6,798,902 B1* 9/2004 McIntyre et al. ........... 382/167
7,106,341 B2* 9/2006 Abe ............................ 345/589
2004/0001230 A1* 1/2004 Kagawa

FOREIGN PATENT DOCUMENTS

JP  2002-190546  7/2002
JP  2004-034327  2/2004

* cited by examiner

Primary Examiner—Douglas Q. Tran

(57) ABSTRACT

An image processing apparatus having a simple structure capable of forming high quality images. The image processing apparatus includes a document reader for generating a first luminance signal for each pixel in a color multi-valued image; a factor multiplication part for multiplying the first luminance signal by a factor to obtain a second luminance signal; a pixel-attribute determination part for determining the color attribute of a noticed pixel based on the second luminance signal; and a main controller. The main controller is configured to count an array attribute determined by an array of the color attributes for 32 lines in a block obtained by dividing a band including 64 lines in the color multi-valued image into eight in the main scanning direction, calculate image-characteristic parameters for the block based on the counted values, determine a block image attribute from the counted values and the calculated parameters, and determine the image attribute of the band based on the determination result.

23 Claims, 6 Drawing Sheets

FINAL DETERMINATION RESULT FOR EACH 32 LINES

IMAGE PROCESSING APPARATUS AND IMAGE PROCESSING METHOD

CROSS REFERENCE TO RELATED APPLICATIONS

This application claims priority from Japanese Patent Application No. 2003-351302 filed Oct. 9, 2003, which is hereby incorporated by reference herein.

BACKGROUND OF THE INVENTION

1. Field of the Invention

The present invention relates to an image processing apparatus and image processing method. More particularly, the invention relates to an image processing apparatus and image processing method which determine an attribute of color image data for each predetermined line.

2. Description of the Related Art

In known image forming apparatuses, various methods are employed in order to improve the recording speed. For example, in an image forming apparatus using an ink-jet method for recording, an apparatus for improving the recording speed has been proposed in, for example, Japanese Laid-Open Patent Application Publication No. 2004-034327 (Japanese Patent Application No. 2002-190546). In the apparatus, a black (Bk) print head is made longer than the other color print heads, and a determination is made on whether the document is a monochrome area or a color area for each line. For a group of lines in a monochrome area, printing is performed using the long, black print head. Even a color image is printed by widening the range that can be printed at a time without deteriorating the image quality.

However, in the image forming apparatus using the known ink-jet method described above, the luminance signal read by the reader is directly image processed. By the inconsistency of linearity which arises in the reader, a group of lines originally determined to be monochrome are sometimes determined to be color. In this case, the group of lines is printed by the color head. Thus, there is a problem in that it takes time to copy a color document mixed with black.

That is to say, in the proposed apparatus described above, when attributes are appropriately determined in the wide area of image data, there is a problem in that the structure of the apparatus is complicated, and an image cannot be formed with high image quality.

SUMMARY OF THE INVENTION

The present invention is directed to an image processing apparatus and image processing method which has a simple structure, and can form an image with high quality when appropriately determining attributes in a wide area of image data.

In one aspect of the present invention, an image processing apparatus for processing pixels of an image includes input means for generating a first luminance signal for each pixel; factor multiplication means for multiplying the first luminance signal of each pixel by a factor to obtain a second luminance signal for each pixel; color-attribute determination means for determining a color attribute for each pixel based on the second luminance signal of said pixel; color-attribute storage means for storing the color attributes determined by the color-attribute determination means for pixels in a predetermined area including a noticed pixel; first counting means for counting an array attribute determined in accordance with the color attributes stored in the color-attribute storage means for a predetermined number of lines of second blocks in a first block obtained by dividing a first line group of the image in a main scanning direction; second counting means for counting the color attributes determined by the color-attribute determination means for the second block; parameter calculation means for calculating parameters indicating an image characteristic for the first block based on the counting by the first counting means and the counting by the second counting means; block-attribute determination means for determining an image attribute of the first block based on the counting by the first counting means, the counting by the second counting means, and the parameters calculated by the parameter calculation means; and line-group image attribute determination means for determining an image attribute of the first line group based on the image attribute determined by the block-attribute determination means. In another aspect of the present invention, an image processing method including a factor multiplication step of multiplying a first luminance signal for each pixel constituting a color multi-valued image by a factor to obtain a second luminance signal; a color-attribute determination step of determining a color attribute of the pixel based on the second luminance signal; a storage step of storing the color attributes determined in the color-attribute determination step for the pixels in a predetermined area including a noticed pixel in a predetermined storage device; a first counting step of counting an array attribute determined in accordance with an array of the color attributes stored in the storage device for a predetermined number of lines of second blocks in a first block obtained by dividing a first line group in the color multi-valued image in a main scanning direction; a second counting step of counting the color attributes determined in the color-attribute determination step for the second block; a parameter calculation step of calculating parameters indicating an image characteristic for the first block based on a count value counted in the first counting step and a count value counted in the second counting step; a block-attribute determination step of determining an image attribute of the first block based on the count value counted in the first counting step, the count value counted in the second counting step, and the parameters calculated in the calculation step; and a line-group image attribute determination step of determining the image attribute of the first line group based on the determination result in the block-attribute determination step. Further features and advantages of the present invention will become apparent from the following description of the embodiment with reference to the attached drawings.

DESCRIPTION OF THE EMBODIMENTS

The best mode for carrying out the invention is the following embodiments.

First Embodiment

Figure 1:
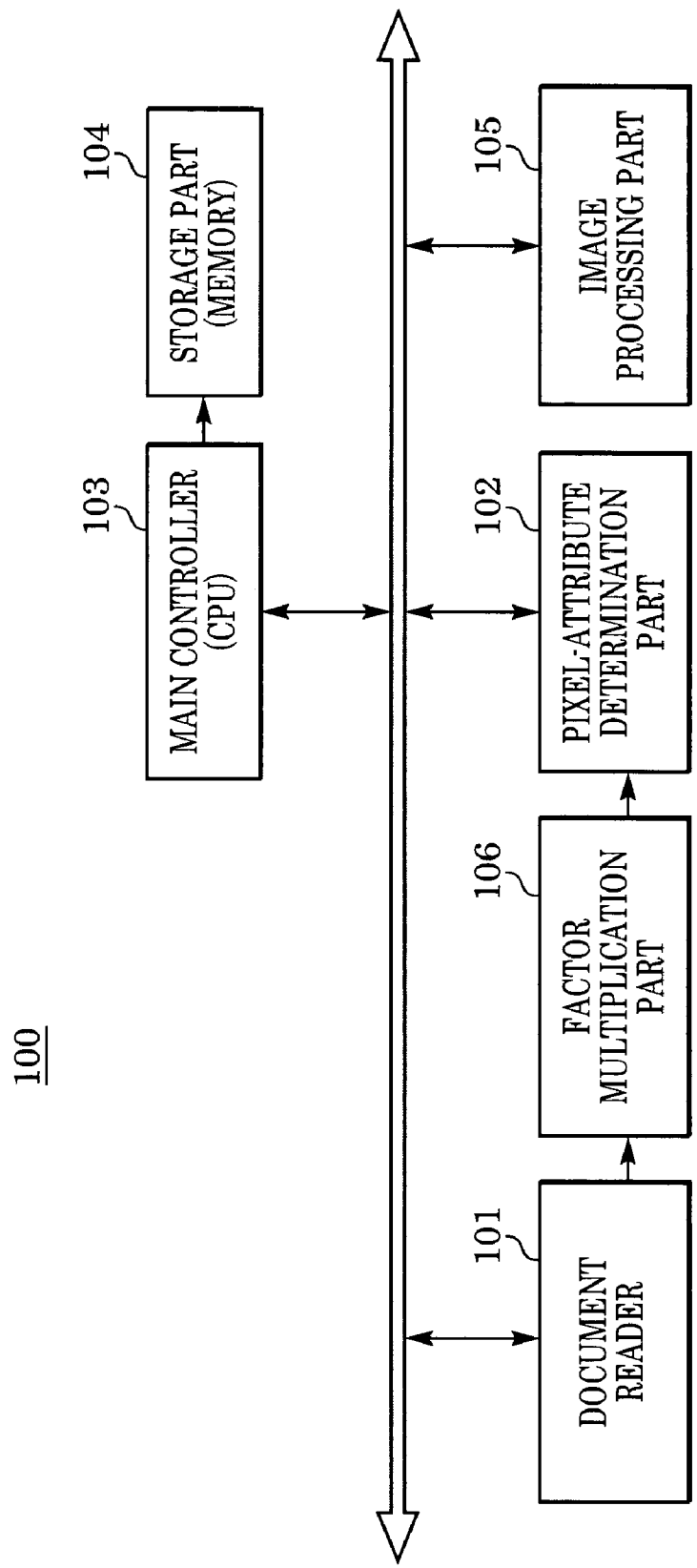
FIG. 1 is a block diagram of an image processing apparatus according to a first embodiment of the present invention.

FIG. 1 is a block diagram of an image processing apparatus 100 according to a first embodiment of the present invention.

The image processing apparatus 100 has a document reader 101, a pixel-attribute determination part 102, a main controller (CPU) 103, a storage part (memory) 104, an image processing part 105, and a factor multiplication part 106. These components of the image processing apparatus 100 are connected to each other through a bus (shown as an outline arrow).

The document reader 101 reads document color image data, that is to say, multi-valued image data of red (in the following, referred to as "R"), green (in the following, referred to as "G"), and blue (in the following, referred to as "B") by a CCD or a CIS (contact image sensor), and obtains a luminance signal for each pixel.

Figure 7:
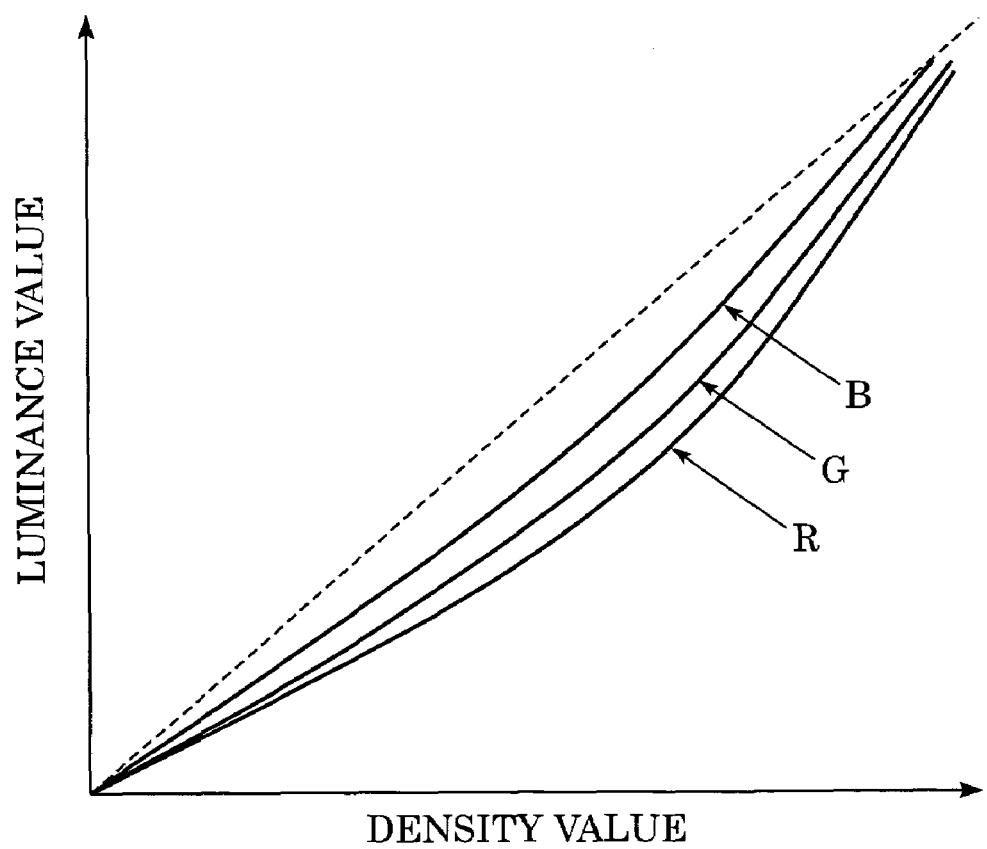
FIG. 7 is a graph illustrating the characteristics of a luminance value with respect to a density value.

FIG. 7 is a graph illustrating the characteristics of a luminance value with respect to a density value.

As shown in FIG. 7, in a CCD or a CIS for consumers, the linearity of the characteristics of a luminance value with respect to a density value sometimes has discrepancies among each image data of RGB.

If the linearity of the characteristics of a luminance value with respect to a density value has discrepancies among each image data of RGB, when a gray image is read, the luminance components of RGB are not output as the same value. Thus, the pixel-attribute determination part 102 determines that the image is a color image even when it is a gray image.

In order to reduce the discrepancies of the linearity, each of the luminance signal data RGB read by the document reader 101 is sent to the factor multiplication part 106. The factor multiplication part 106 multiplies each luminance component by a predetermined factor. The multiplied luminance signal is then sent to the pixel-attribute determination part 102.

More specifically, when a predetermined gray image is read, in the case of a CCD or a CIS which has luminance values R=95, G=100, and B=105 for the color image data R, G, B in 256 grayscales, assuming the factors by which each of the luminance values are to be multiplied are Kr, Kg, Kb, respectively, the settings are determined such that Kr=1.05, Kg=1.00, and Kb=0.95. When the obtained luminance values are multiplied by each of the factors, respectively, the values R=100, G=100, and B=100 are obtained.

Also, by comparing the color image data read by the document reader 101 with a predetermined threshold value, the pixel-attribute determination part 102 determines an attribute for each pixel and counts each attribute.

The main controller 103 controls the entire image processing apparatus 100 through a system bus, and determines an attribute using the count value for each attribute counted by the pixel-attribute determination part 102. Also, the main controller 103 is connected to the storage part (memory) 104. The memory 104 is used when the main controller 103 makes determinations for a predetermined number of lines. The image processing part 105 receives the result of the determination made by the main controller 103, and performs high-quality image processing.

Figure 2:
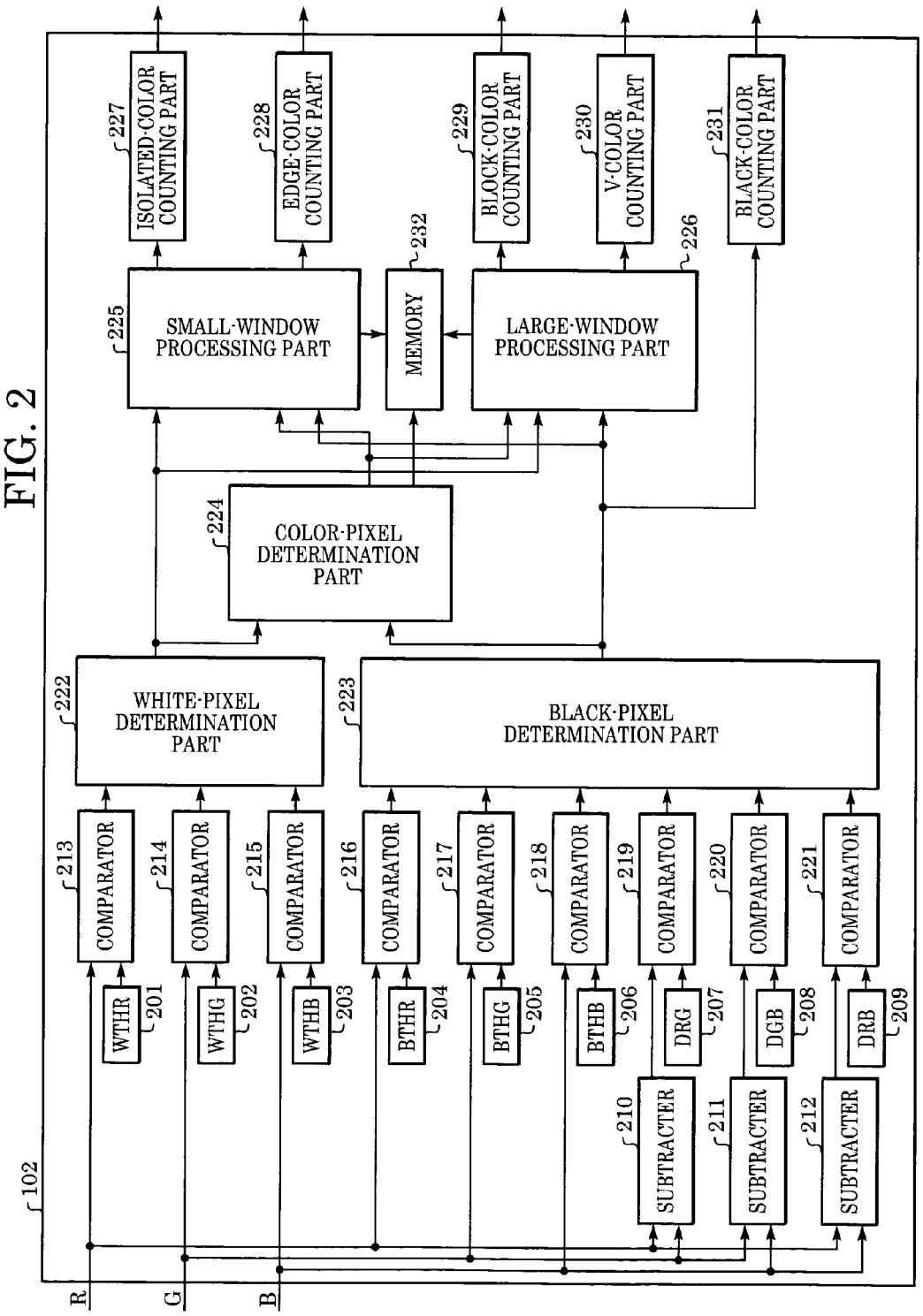
FIG. 2 is a block diagram illustrating the detailed structure of a pixel-attribute determination part provided in the image processing apparatus.

FIG. 2 is a block diagram illustrating the detailed structure of the pixel-attribute determination part 102 provided in the image processing apparatus 100.

The pixel-attribute determination part 102 has registers 201 to 209, subtracters 210 to 212, comparators 213 to 221, a white-pixel determination part 222, a black-pixel determination part 223, a color-pixel determination part 224, a small-window processing part 225, a large-window processing part 226, an isolated-color counting part 227, an edge-color counting part 228, a block-color counting part 229, a V-color counting part 230, a black-color counting part 231, and a memory 232.

The registers 201 to 209 include D flip-flops (DFF), etc., which store parameters necessary for determining the attribute of the color image data read by the document reader 101 for each pixel. The main controller 103 sets predetermined threshold values in the registers.

The WTHR (threshold-value setting register) 201, the WTHG (threshold-value setting register) 202, and the WTHB (threshold-value setting register) 203 are registers for determining whether or not each of the pixel data R, G, and B output by the document reader 101 is a white pixel.

The WTHR 201 stores a determination level for the white-pixel determination of the R-signal level of the pixel data output by the document reader 101. The WTHG 202 stores a determination level for the white-pixel determination of the G-signal level of the pixel data output by the document reader 101. The WTHB 203 stores a determination level for the white-pixel determination of the B-signal level of the pixel data output by the document reader 101.

Furthermore, the BTHR 204, the BTHG 205, the BTHB 206, the DRG 207, the DGB 208, the DRB 209 are threshold-value setting registers for determining whether or not each of the pixel data R, G, B output by the document reader 101 is a black pixel.

The BTHR 204 stores a determination level for the black-pixel determination of the R-signal level of the pixel data output by the document reader 101.

In the same manner, the BTHG 205 stores a determination level for the black-pixel determination of the G-signal level of the pixel data output by the document reader 101. The BTHB 206 stores a determination level for the black-pixel determination of the B-signal level of the pixel data output by the document reader 101.

At the same time, the DRG 207 is a threshold-value setting register for determining whether or not the pixel data output by the document reader 101 is a black pixel. A threshold value on the absolute value of the difference between the R-signal level and the G-signal level is set in this register.

The DGB 208 is a threshold-value setting register for determining whether or not the pixel data output by the document reader 101 is a black pixel. A threshold value on the absolute value of the difference between the G-signal level and the B-signal level, which are output by the document reader 101, is set in this register. The DRB 209 is a threshold-value setting register for determining whether or not the pixel data output by the document reader 101 is a black pixel. A threshold value on the absolute value of the difference between the R-signal level and the B-signal level, which are output by the document reader 101, is set in this register.

The color image data read by the document reader 101 is compared with a threshold value stored in the above-described threshold-value setting register for each signal component of each pixel. That is to say, for a white-pixel determination, the comparator 213 compares the R-signal level of the input pixel data and the threshold value set in the WTHR 201. When the R-signal level of the input pixel is higher than the predetermined threshold value set in the WTHR 201, the comparator 213 outputs a signal ("Hi level") satisfying the condition.

In the same manner, the comparator 214 compares the G-signal level of the input pixel data and the threshold value set in the WTHG 202. The comparator 215 compares the B-signal level of the input pixel data and the threshold value set in the WTHB 203. When the signal levels are higher than the threshold values set in the WTHG 202 and WTHB 203, respectively, each of the comparators 214 and 215 outputs a signal ("Hi level") satisfying the condition. Thus, a determination can be made on whether or not the input pixel data is a white pixel.

At the same time, for a black-pixel determination, first, the comparator 216 compares the R-signal level of the input pixel data and the threshold value set in the BTHR 204. When the R-signal level of the input pixel is lower than the predetermined threshold value set in the BTHR 204, the comparator 216 outputs a signal ("Hi level") satisfying the condition.

In the same manner, the comparator 217 compares the G-signal level of the input pixel data and the threshold value set in the BTHG 205. The comparator 218 compares the B-signal level of the input pixel data and the threshold value set in the BTHB 206. When the G-signal level and the B-signal level are lower than the threshold values set in the BTHG 205 and BTHB 206, respectively, each of the comparators 217 and 218 outputs a signal ("Hi level") satisfying the condition.

Furthermore, for a black-pixel determination, the comparators 219, 220, and 221 make determinations using the absolute values of the individual differences among the R-signal level, the G-signal level, and the B-signal level.

That is to say, the subtracter 210 calculates the absolute value of the difference between the R-signal level and the G-signal level of the input pixel data. The threshold value on the absolute value of the difference between the R-signal level and the G-signal level for a black-signal determination set in the DRG 207 is compared with the calculation result of the subtracter 210. If the calculation result of the subtracter 210 is smaller than the threshold value set in the DRG 207, the comparator 219 outputs a signal ("Hi level") indicating satisfaction of the condition.

In the same manner, the comparator 220 compares the calculation result of the absolute value of the difference between the G-signal level and the B-signal level of the input pixel data by the subtracter 211, and the threshold value on the absolute value of the difference between the G-signal level and the B-signal level on the black-pixel determination set in the DGB 208.

If the calculation result of the subtracter 211 is smaller than the threshold value set in the DGB 208, the comparator 220 outputs a signal ("Hi level") indicating satisfaction of the condition. Also, the comparator 221 compares the calculation result of the absolute value of the difference between the R-signal level and the B-signal level of the input pixel data by the subtracter 212, and the threshold value on the absolute value of the difference between the R-signal level and the B-signal level on the black-pixel determination set in the DRB 209. Then, if the calculation result by the subtracter 212 is smaller than the threshold value set in the DRB 209, the comparator 221 outputs a signal ("Hi level") indicating satisfaction of the condition.

As described above, if the absolute value of the difference among each color component is smaller than a predetermined threshold value, by making them satisfy the condition, an achromatic color such as gray can be determined as a black pixel.

Next, a description will be given on the white-pixel determination, a black-pixel determination, and a color-pixel determination of the input pixel data.

The white-pixel determination part 222 performs the white-pixel determination of the input pixel based on the output signals of the comparators 213, 214, and 215. Specifically, when all the outputs of the comparators 213, 214, and 215 are the signals ("Hi level" signals) satisfying the condition, the white-pixel determination part 222 determines that the input pixel is a white pixel, and outputs the determination signal.

The black-pixel determination part 223 performs the black-pixel determination of the input pixel based on the output signals of the comparators 216 to 221. Specifically, when all the outputs of the comparators 216 to 221 are the signals ("Hi level" signals) satisfying the condition, the black-pixel determination part 223 determines that the input pixel is a black pixel, and outputs the determination signal.

The black-color counting part 231 receives the output signal of the black-pixel determination part 223, and counts the number of black pixels.

The color-pixel determination of the input pixel data is performed by referring to the output signal of the white-pixel determination part 222 and the output signal of the black-pixel determination part 223. That is to say, if neither the output of the white-pixel determination part 222 nor the output of the black-pixel determination part 223 is the signal which ("Hi level") satisfies the condition, the input pixel data is determined to be a color pixel, and the determination signal is output.

As described above, the input pixel data can be determined to be any one of a white pixel, a black pixel, and a color pixel. That is to say, the pixel-attribute determination part 102 characteristically has the white-pixel determination part 222 which determines whether or not the notice pixel is a white pixel, the black-pixel determination part 223 which determines whether or not the notice pixel is a black pixel, and the color-pixel determination part 224 which determines whether or not the notice pixel is a color pixel.

Also, in the image processing apparatus 100, the white-pixel determination part 222 characteristically determines whether or not the noticed pixel is a white pixel by comparing the input luminance signal with a predetermined threshold value.

Also, in the image processing apparatus 100, the black-pixel determination part 223 characteristically determines whether or not the noticed pixel is a black pixel based on the comparison between the input luminance signal and a predetermined threshold value, and the comparison between the difference value among the color components of the luminance signal and a predetermined threshold value.

Next, a description will be given about the pixel-attribute classification method of the noticed pixel.

The determination results by the white-pixel determination part 222, the black-pixel determination part 223, and the color-pixel determination part 224 are inputted to the small-window processing part 225 and the large-window processing part 226. Furthermore, the memory 232 is connected to the small-window processing part 225 and the large-window processing part 226. In this regard, the memory 232 has a capacity of two bits for each one input pixel, and has the storage capacity for the number of pixels in the main scanning direction.

Figure 3:
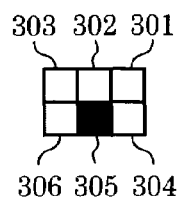
FIG. 3 is a diagram illustrating the processing window in a small-window processing part.

FIG. 3 is a diagram illustrating the structure of the processing window in the small-window processing part 225.

As shown in FIG. 3, in the above-described embodiment, the small-window processing part 225 performs processing using a window having a size of three pixels in the main scanning direction and two pixels in the sub-scanning direction.

Registers 301 to 306 are the registers for maintaining the determination results corresponding to an input pixel. Also, the registers are shift registers, and at the time of input of the pixel data, storage data in a register is shifted to the subsequent-stage register for each line. That is to say, at the time of input of the pixel data, the storage data in the register 301 is stored in the register 302, and the storage data in the register 304 is stored in the register 305.

Figure 4:
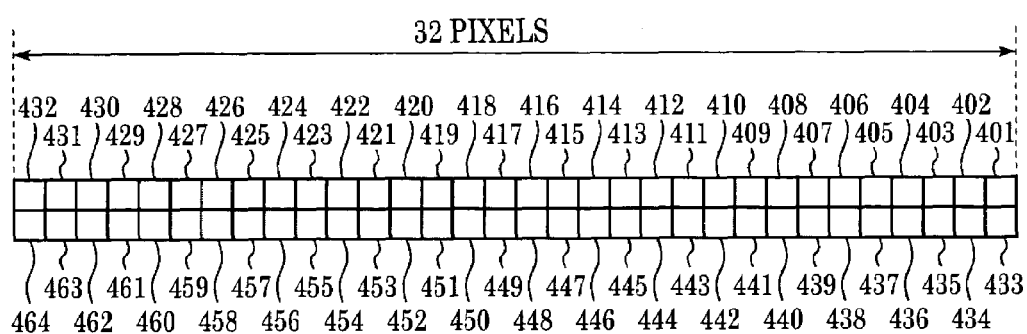
FIG. 4 is a diagram illustrating the processing window in a large-window processing part.

FIG. 4 is a diagram illustrating the structure of the processing window in the large-window processing part 226.

The large-window processing part 226 uses a window having a size of 32 pixels in the main scanning direction and two pixels in the sub-scanning direction.

Registers 401 to 464 are for maintaining the determination results corresponding to an input pixel. Also, the registers are shift registers, and at the time of input of the pixel data, storage data in a register is shifted to the subsequent-stage register for each line. That is to say, at the time of input of the pixel data, the storage data in the register 401 is stored in the register 402, and the storage data in the register 433 is stored in the register 434.

Also, the register 301 and the register 401 store the determination results of the pixel of the previous line obtained from the memory 232. The register 304 and the register 433 store the determination results of the input pixel.

That is to say, the image processing apparatus 100 maintains a color attribute for each pixel for a predetermined line in a color multi-valued image. The image processing apparatus 100 characteristically stores, in a window format, the color attribute for each pixel for the maintained line and the color attribute for each pixel for the next line of that line in the sub-scanning direction.

Also, the image processing apparatus 100 characteristically stores a color attribute for each pixel in a first window format including M pixels in the main scanning direction and two pixels in the sub-scanning direction in the memory 232. At the same time, the image processing apparatus 100 characteristically stores the color attribute for each pixel in a second window format including N pixels in the main scanning direction and two pixels in the sub-scanning direction. In this regard, in the embodiment described above, M is 3, and N is 32.

The pixel-attribute determination of the noticed pixel in the small-window processing part 225 and the large-window processing part 226 are performed based on the determination result of each pixel of the previous line and the determination result of the pixel of the current-read line as shown in FIGS. 3 and 4, respectively.

The determination result data read from the memory 232 becomes unnecessary after having been stored in the register 301 and the register 401. Thus, the determination result of a new input pixel is stored in the address of the memory 232 which has stored the determination result data. Accordingly, as the memory 232 for maintaining the determination result of the previous line, it is sufficient to have the capacity of the number of the pixel in the main scanning-direction for one line of the input document image data at minimum.

Also, the data stored in the registers 301 to 306, the registers 401 to 464, and the memory 232 are initialized to a white-pixel determination result for each processing document or for each processing line. Also, the register 305 shown by black in FIG. 3 represents the determination data of the noticed pixel to be the target of the determination.

For the data stored in each of the registers shown in FIGS. 3 and 4, if the pixel to be inputted into the small-window processing part 225 and the large-window processing part 226 is a white pixel, the small-window processing part 225 and the large-window processing part 226 store two-bit data "11", which indicates that the input pixel is a white pixel, in each of the registers. Here, the data indicating that the input pixel is a white pixel is assumed to be "11".

Also, if the input pixel is a black pixel, the small-window processing part 225 and the large-window processing part 226 store two-bit data "00", which indicates that the input pixel is a black pixel, in each of the registers.

Furthermore, if the input pixel is a color pixel, the small-window processing part 225 and the large-window processing part 226 store two-bit data "10" or "01", which indicates that the input pixel is a color pixel, in each of the registers. That is to say, if the pixel determination result of the previous line of the input pixel is a color pixel, both of the parts store "01", which indicates the determination of a consecutive color pixel, in each of the registers. If the pixel determination result of the previous line of the input pixel is a white pixel or a black pixel, both of the parts store "10", which indicates the determination of a single color pixel, in each of the registers.

In the embodiment described above, for the input pixel data, not only is it determined whether the data is a color pixel, but also whether the data is a consecutive color data or a single color data.

That is to say, in the image processing apparatus 100, the color-pixel determination part 224 determines that the noticed image is a color pixel if both the white-pixel determination part 222 and the black-pixel determination part 223 make determinations in the negative. Also, the noticed pixel is determined to be a consecutive color pixel if the corresponding pixel of the previous line, in the sub-scanning direction, of the line including the determined color pixel has been determined to be a color pixel. Also, the noticed pixel is determined to be a single color pixel if the corresponding pixel of the previous line, in the sub-scanning direction, of the line including the determined color pixel has been determined not to be a color pixel.

Next, a description will be given of the processing in the edge-color counting part 228.

The edge-color counting part 228 counts the color pixels attached to a black character detected by the small-window processing part 225. Specifically, at the timing when the pixel data is inputted into the small-window processing part 225, the register 305 for the noticed pixel stores either "10" or "01", which indicates the result of the color pixel determination. If any one of the pixels surrounding the noticed pixel (pixels stored in the registers 301 to 304, and the register 306) stores "00" indicating the black pixel determination, the small-window processing part 225 outputs a signal to the edge-color counting part 228. The edge-color counting part 228 receives that output signal, and counts the number of edge colors.

Next, a description will be given of the processing in the isolated-color counting part 227.

The isolated-color counting part 227 counts the color pixels not attached to a black character, which is detected by the small-window processing part 225. Specifically, at the timing when the pixel data is inputted into the small-window processing part 225, the register 305 for the noticed pixel stores either "10" or "01", which indicates the result of the color pixel determination. If any one of the pixels surrounding the noticed pixel (pixels stored in the registers 301 to 304, and 306) does not store "00" indicating the black pixel determination, the small-window processing part 225 outputs a signal to the isolated-color counting part 227. The isolated-color counting part 227 receives the output signal, and counts the number of the color pixels.

Next, a description will be given of the processing in the V-color counting part 230.

The V-color counting part 230 counts the color vertical ruled lines detected by the large-window processing part 226. Specifically, at the timing when the pixel data is inputted into the large-window processing part 226, the large-window processing part 226 outputs a signal to the V-color counting part 230 if registers storing "10" or "01", which indicates the result of the color-pixel determination, excluding both of the end registers 401, 432, 433, and 464, are disposed consecutively in a longitudinal direction (for example, the registers 416 and 448), and there is no register storing "00", which indicates the result of the black-pixel determination among all the registers including both of the end registers. The V-color counting part 230 receives the output signal, and counts the number of V colors.

Also, the block-color counting part 229 counts the color pixels in a wide area, which are detected by the large-window processing part 226. Specifically, at the same timing as the V-color counting part 230, the large-window processing part 226 outputs a signal to the block-color counting part 229 if "01", which indicates the result of the consecutive color-pixel determination, is stored in an area of 16×2 pixels or more (for example, if "01" is stored in the registers 410 to 425, and 442 to 457) among all the registers. The block-color counting part 229 receives the output signal, and counts the number of block colors. In this regard, in this embodiment, the above-described area includes 16×2 pixels. However, the above-described embodiment can be applied to areas including other than 16×2 pixels.

That is to say, the pixel-attribute determination part 102 in the image processing apparatus 100 has the edge-color counting part 228, which counts, for each second block, the number of windows of when the noticed pixel is a color pixel in the small-window processing part 225, and at least one black pixel is adjacent to the noticed pixel in order to obtain the number of first array attributes; the V-color counting part 230 which counts, for each second block, the number of windows of when color pixels are disposed consecutively in a longitudinal direction in the window area excluding the four both-end pixels in the large-window processing part 226, and there is no black pixels in the window area including the four both-end pixels in order to obtain the number of second array attributes; the block-color counting part 229 which counts, for each second block, the number of windows of when there are consecutive color pixels in the window area of I pixels in the main scanning direction and two pixels in the sub-scanning direction in the large-window processing part 226 in order to obtain the number of third array attributes; and the isolated-color counting part 227 which counts, for each second block, the number of windows of when the noticed pixel is a color pixel, and there is no black pixel in the surroundings of that color pixel in the small-window processing part 225 in order to obtain the number of fourth array attributes.

The main controller 103 determines whether a predetermined area is a monochrome image or a color image using the count result counted by each counting part described above in the pixel-attribute determination part 102. For example, in this embodiment, an area of 64 lines in the sub-scanning direction is "one band", the area is divided into eight in the main scanning direction, the divided area is set to "one block", and a determination is made for each of the blocks. In this regard, the determination band unit is not limited to the 64 lines in the sub-scanning direction, and the determination band unit can be set to an area wider than 64 lines or a narrower area. In this case, the above-described embodiment can be applied.

Also, the number of divisions in the main direction is not limited to eight, and may be larger or smaller than eight for the determination.

Figure 5:
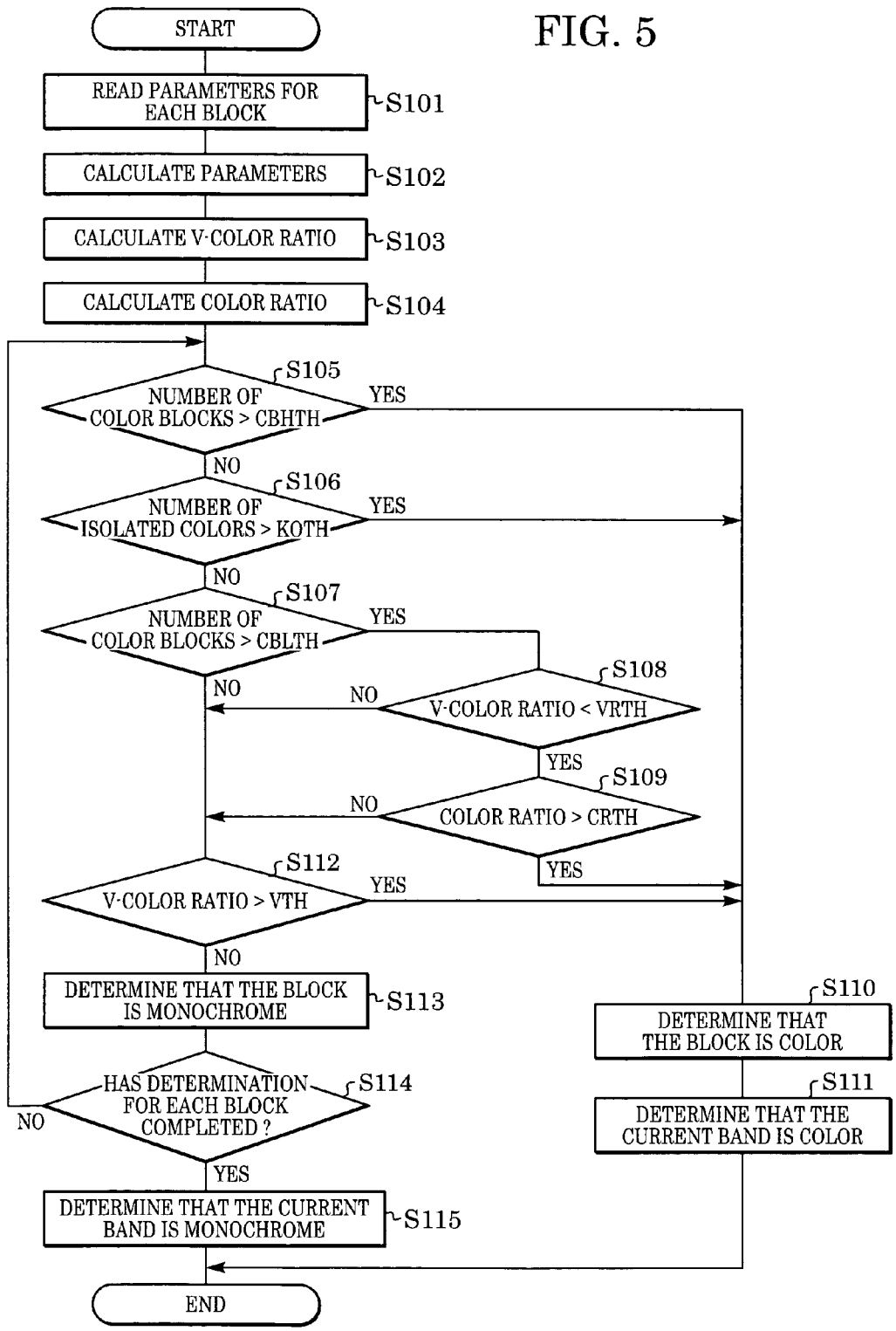
FIG. 5 is a flowchart illustrating the determination processing steps for each one band in a main controller.

FIG. 5 is a flowchart illustrating the determination processing steps for each one band in the main controller 103.

First, at the timing when a half (32 lines) of the 64 lines constituting a band are counted by each counting part of the pixel-attribute determination part 102, the main controller 103 reads those count values, and resets the value of each counting part (S101). That is to say, in this embodiment, each counting part is initialized at the timing when pixels for 32 lines are counted.

Here, the memory 104 stores the count values for the previous 32 lines of the 32 lines currently counted. In this regard, the timing of reading each count value in the embodiment described above is not limited to a half of the number of lines of the band structure, and the timing of reading each count value may be set to that number of lines or more, or may be set to that number of lines or less.

Next, by adding, for each block, the count values for the previous 32 lines stored in the memory 104 and the count values for the current 32 lines read from each counting part, the black pixel count value, the white pixel count value, and the color pixel count value are calculated for each 64 lines (S102). In this regard, after completing this addition, the memory 104 stores the count values for the current 32 lines for each block.

Next, calculate the following expression (1) based on the V-color count value and the edge-color count value to obtain a V-color ratio (S103).

(V-color ratio)=(Number of V-colors)/(Number of edge-colors)   Expression (1)

The block having a V-color ratio of about 1 is considered to be a character area.

Also, in step S104, calculate the following expression (2) based on the isolated-color count value and the black-pixel count value to obtain a color ratio (S104).

(Color ratio)=(Number of isolated colors)/(Number of black pixels)   Expression (2)

In a band having a large color ratio, a color image of a wide area is considered to exist.

That is to say, in the above-described embodiment, the main controller 103 counts, for each second block, the pixels determined to be black pixel by the black-pixel determination part 223 to obtain a black-pixel count value. Also, in the image processing apparatus 100, the main controller 103 obtains a first parameter using the ratio of the number of edge colors to the number of V colors, and obtains a second parameter using the ratio of the number of isolated colors to the number of black pixels.

As described above, the main controller 103 calculates, for each 32 lines, the above-described Expression (1) and Expression (2) based on the count values counted, for each block, by each counting part to obtain a determination factor for 64 lines. Then using this factor, the attribute of each block is determined as described below.

First, a determination is made whether or not the number of color blocks is greater than a predetermined value CBHTH (S105). If the number of color blocks is greater than CBHTH (Yes), that block is determined to be a color-image area (S110). This is because a color image is considered to be disposed all over the wide area in that block.

Also, if the number of color blocks is less than CBHTH (No), and the number of isolated colors is greater than a predetermined value KOTH (S106), that block is determined to be an area of a color image (S110). This is because that block is considered to be a dot image having few black points, and thus that block is determined to be an area of a color image.

On the other hand, if determined No in step S106, the number of color blocks is greater than CBLTH (S107), the V-color ratio is smaller than a predetermined value VRTH (S108), and the color ratio is larger than a predetermined value CRTH (S109), a dot image is considered to be detected, and thus that block is determined to be an area of a color image (S110). In this regard, in the above-described embodiment, it is assumed that CBLTH<CBHTH. However, it may not be limited to this.

On the other hand, if determined No in steps S107 and S108, or in step S109, and the number of V colors is greater than VTH (S112), that block is determined to be an area of a color image (S110).

Also, if determined No in step S112, that block is determined to be an area of a monochrome image (S113). That is to say, if a color ruled line is not detected for the block whose attribute is undetermined, that block is determined to be an area of a monochrome image.

That is to say, in the above-described embodiment, by the main controller 103 comparing the counted value, the calculated first parameter (V-color ratio), and the second parameter (color ratio) with predetermined threshold values, respectively, the image attribute of the block is determined.

As described above, the color or monochrome attribute determination is performed for each block, and the color or monochrome attribute determination is performed for each band (64 lines) using that result.

Next, a description will be given of the method for the attribute determination for each band using the attribute determination result for each block.

When the block is determined to be an area of a color image in step S110, even if there is an undetermined block in the current band, the current band is determined to be color (S111). That is to say, if there is at least one block determined to be color in the current band, the current band is determined to be color.

In this regard, in this embodiment, if there is at least one block that was determined to be color, the current band is determined to be color. However, the color-attribute determination and the monochrome-attribute determination matrix is performed for all the blocks in the current band, and the current band may be determined to have a color attribute or a monochrome attribute by using the combination of the attribute determination results for each of the blocks.

For example, if there are three blocks or more that was determined to be color, it may be determined that the current band is an area of a color image. Also, if there are two consecutive blocks that was determined to be color, it may be determined that the current band is color.

On the other hand, in step S113, if the block is determined to be a monochrome image, and there is a block that has not been determined to be color or monochrome in the current band (S114), the same attribute determination is performed for the undetermined blocks in step S105. Also, if the color or monochrome attribute determination is completed for all the blocks (S114), and all the blocks are determined to be monochrome, the current band is determined to be monochrome (S115).

As described above, in this embodiment, the color or monochrome attribute determination is performed for each band (64 lines). That is to say, in the above-described embodiment, the main controller 103 determines whether or not the image attribute of the first line group is monochrome in accordance with the determination result on the blocks. As final determination means, if the image attributes of the first line group and the second line group are determined to be both monochrome, the image attribute of the third line group commonly included is determined to be mechanism.

Next, a description will be given of the final determination processing performed using the determination result for each band described above.

FIG. 6 is an explanatory diagram when the final attribute determination processing is performed for each ½ band (32 lines) in the embodiment described above.

As described above, in the above-described embodiment, the main controller 103 calculates the determination factor for one band (64 lines) based on the count values of each counting part, which have been read for each 32 lines, and each calculation result generated by Expression (1) and Expression (2). By using this calculated determination factor in the determination processing for each block shown in FIG. 5, the color or monochrome attribute is determined for each one band.

Figure 6A:
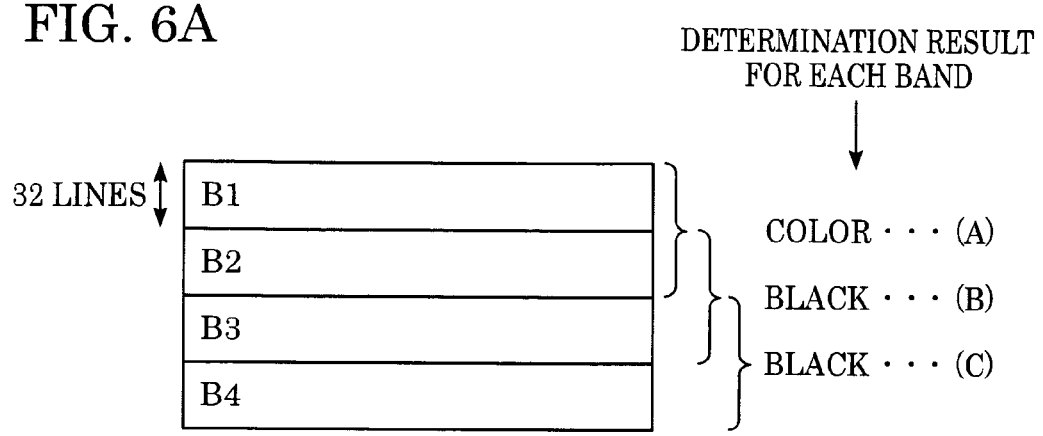
FIGS. 6A and 6B are explanatory diagrams of when final-attribute determination processing for each ½ band (32 lines) is performed.

FIG. 6A illustrates an example constituting a band of 64 lines using data areas B1 to B4, each of which includes 32 lines in a document image. In FIG. 6A, for the 64-line data (band A) including the area B1 and the area B2, each of the areas is determined to be color by the determination processing shown in FIG. 5. In the same manner, it is assumed that for the 64-line data (band B) including the area B2 and the area B3, the areas are determined to be monochrome, and for the 64-line data (band C) including the area B3 and the area B4, the areas are determined to be monochrome.

In the following, a description will be given of an example in which final determination is performed on the data shown in FIG. 6A.

In this embodiment, the final determination is performed not only by the determination of each 64 lines described above, but the area determination for the 32 lines having a duplicated determination results is performed using the two bands including 64 lines. That is to say, the final determination for B2, which is a 32-line area, is performed based on the determination result of the band A and the determination result of the band B. In the same manner, the final determination for B3, which is a 32-line area, is performed based on the determination result of the band B and the determination result of the band C. Specifically, only when the previous and the succeeding 64-line structures including the 32-line data for performing the final destination are both monochrome, the final determination result is determined to be monochrome.

Figure 6B:
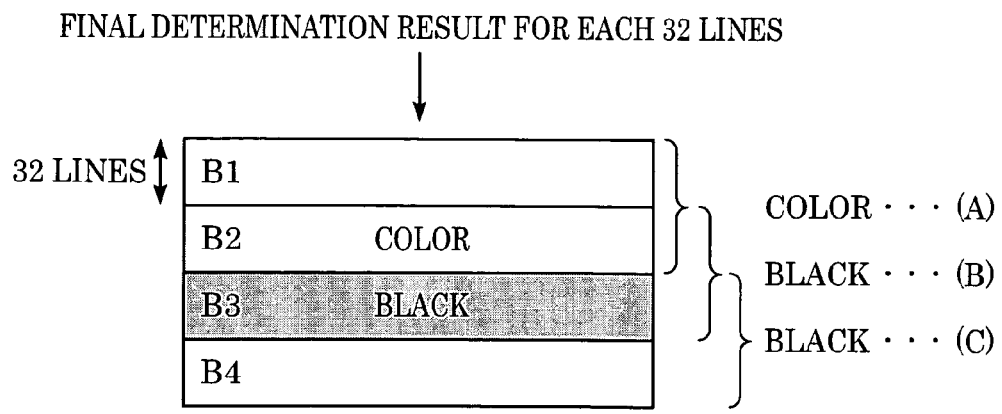

FIG. 6B is a diagram illustrating the final determination result in the example of FIG. 6A.

In this example, since the determination result of the band A is color, and the determination result of the band B is monochrome, the area B2 is finally determined to be color. Also, since the determination result of the band B and the determination result of the band C are both monochrome, the area B3 is finally determined to be monochrome.

That is to say, in this embodiment, the first line group and the second line group have the same number of lines. Also, in this embodiment, the third line group characteristically has a half the number of lines of the first line group and the second line group.

The determination result signal output from the main controller 103 is sufficient to indicate whether it is a monochrome image or a color image, and thus one-bit data is outputted. Specifically, if the result is a monochrome image, a "Hi level" is output, and if it is a color image, a "Low level" is outputted.

The image processing part 105 uses the determination result signal output from the main controller 103 for high-quality image processing. For example, for the pixel determined to be a black pixel, it is determined as a black character area, and the image processing suited to a character area is performed on the pixel. On the other hand, for the pixel determined not to be a black pixel, for example, image processing suited to a photograph area is performed on the pixel. That is to say, in this embodiment, the image processing part 105 performs the image processing in accordance with the image attribute of the third line group determined by the main controller 103 on that third line group.

In this regard, in this embodiment, the attribute determination for each band is executed by the software operation in the main controller 103. However, the attribute determination for each band may be executed by hardware.

Also, in the embodiment described above, each threshold value to be used for the attribute determination may be fixed. Alternatively, for example, each of the above-described threshold values may be arbitrary changeable in accordance with the processing operation mode of the apparatus.

According to the present embodiment, the linearity of a CCD and a CIS can be corrected with a simple structure, and thus the determination precision of the pixel-attribute determination part can be improved. By the improvement of the determination precision, a line group which has been mistakenly determined to be a color image is correctly determined as a monochrome image. It is, therefore, possible to print the image using a monochrome head, which is longer than a color head, and thus the print speed can be improved.

Moreover, since a line group which has been mistakenly determined to be a color image is correctly determined as a monochrome image, the amount of data to be sent to the image processing part of the subsequent stage, etc. can be reduced, and thus the recording speed can be improved.

That is to say, the image processing apparatus 100 is an example of the image processing apparatus which includes: a document reader 101 for generating/inputting a first luminance signal for each pixel in a color multi-valued image; a factor multiplication part 106 for obtaining a second luminance signal by multiplying the first luminance signal by a factor; a pixel-attribute determination part 102 for determining the color attribute of a noticed pixel based on the second luminance signal; and in which the determined color attributes are stored for as many pixels as the pixels in a predetermined area including the noticed pixel; the main controller 103 counts an array attribute determined in accordance with an array of the color attributes stored for 32 lines in a first block obtained by dividing, into eight in the main scanning direction, a band (first line group) including a predetermined 64 lines in the color multi-valued image; counts the determined color attributes for the 32 lines; calculates parameters indicating an image characteristic for the block based on the counted value; determines an image attribute of the block in accordance with the counted value and the calculated parameters; and determines the image attribute of the band based on the determination result.

Also, the main controller 103 of the image processing apparatus 100 determines the image attribute of the third line group commonly included in the first line group and the second line group based on the determination result on the first line group and the determination result on a predetermined half band (second line group).

In this regard, the above-described embodiment may be applied to a system including a plurality of apparatuses (for example, a host computer, an interface device, a reader, a printer, etc.). Also, the embodiment may be applied to an apparatus, which is one unit (for example, a copying machine, a facsimile, etc.).

Also, the storage medium (or recording medium), which records the program code of the software achieving the functions of the above-described embodiment, may be supplied to a system or an apparatus. Then the computer (or CPU, MPU) of the system or the apparatus may read the program code stored in the storage medium to execute it.

That is to say, the above-described embodiment is an example of a computer program which causes a computer to execute processing including: a factor multiplication step of multiplying a first luminance signal for each pixel constituting a color multi-valued image by a factor to obtain a second luminance signal; a color-attribute determination step of determining a color attribute of the pixel based on the second luminance signal; a storage step of storing the color attributes determined in the color-attribute determination step for the pixels in a predetermined area including a noticed pixel in a predetermined storage device; a first counting step of counting an array attribute determined in accordance with an array of the color attributes stored in the storage device for a predetermined number of lines of second blocks in a first block obtained by dividing a first line group in the color multi-valued image in a main scanning direction; a second counting step of counting the color attributes determined in the color-attribute determination step for the second block; a parameter calculation step of calculating parameters indicating an image characteristic for the first block based on a count value counted in the first counting step and a count value counted in the second counting step; a block-attribute determination step of determining an image attribute of the first block based on the count value counted in the first counting step, the count value counted in the second counting step, and the parameters calculated in the calculation step; a line-group image attribute determination step of determining the image attribute of the first line group based on the determination result in the block-attribute determination step; and a final determination step of determining an image attribute of a third line group commonly included in the first line group and the second line group based on the determination result for the first line group in the line-group image attribute determination step and the determination result for a predetermined second line group.

In this case, the program code itself which is read from the storage medium achieves the functions of the above-described embodiment, and the storage medium storing the above-described program code constitutes the above-described embodiment. Also, the functions of the above-described embodiment is achieved not only by executing the program code read by a computer, but the operating system (OS), etc. running on the computer executes a part of or all of the actual processing based on the instructions of the program code, and the functions of the above-described embodiment is achieved by the processing.

Furthermore, the program code read from the storage medium may be written into a function-expansion card inserted in a computer or into a memory provided in a function-expansion unit connected to a computer. Thereafter the CPU, etc. provided with the function-expansion card or the function-expansion unit may execute a part of or all of the actual processing based on the instructions of the program code, and the functions of the above-described embodiment may be achieved by the processing.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for processing pixels of an image, comprising:
   input means for generating a first luminance signal for each pixel;
   factor multiplication means for multiplying the first luminance signal of each pixel by a factor to obtain a second luminance signal for each pixel;
   color-attribute determination means for determining a color attribute for each pixel based on the second luminance signal of said pixel;
   color-attribute storage means for storing the color attributes determined by the color-attribute determination means for pixels in a predetermined area including a noticed pixel;
   first counting means for counting an array attribute determined in accordance with the color attributes stored in the color-attribute storage means for a predetermined number of lines of second blocks in a first block obtained by dividing a first line group of the image in a main scanning direction;
   second counting means for counting the color attributes determined by the color-attribute determination means for the second block;
   parameter calculation means for calculating parameters indicating an image characteristic for the first block based on the counting by the first counting means and the counting by the second counting means;
   block-attribute determination means for determining an image attribute of the first block based on the counting by the first counting means, the counting by the second counting means, and the parameters calculated by the parameter calculation means; and
   line-group image attribute determination means for determining an image attribute of the first line group based on the image attribute determined by the block-attribute determination means.

2. The image processing apparatus according to claim 1, further comprising final determination means for determining an image attribute of a third line group based on the image attribute of the first line group determined by the line-group image attribute determination means and a determination for a predetermined second line group.

3. The image processing apparatus according to claim 2, wherein the color-attribute determination means comprises:
   white-pixel determination means for determining whether or not the pixel is a white pixel;
   black-pixel determination means for determining whether or not the pixel is a black pixel; and
   color-pixel determination means for determining whether or not the pixel is a color pixel.

4. The image processing apparatus according to claim 3, wherein the white-pixel determination means determines whether or not the pixel is a white pixel by comparing the second luminance signal with a predetermined threshold value.

5. The image processing apparatus according to claim 3, wherein the black-pixel determination means determines whether or not the pixel is a black pixel by comparing the second luminance signal with a predetermined threshold value and comparing a difference value among color components of the second luminance signal with a predetermined threshold value.

6. The image processing apparatus according to claim 3,
   wherein the color-pixel determination means determines that the pixel is a color pixel responsive to both the white-pixel determination means determining that the pixel is not a white pixel and the black-pixel determination means determining that the pixel is not a black pixel,
   wherein the color-pixel determination means determines that the color attribute of the noticed pixel is a consecutive color pixel responsive to the color-pixel determination means determining that a corresponding pixel in a previous line relative to a line including the noticed pixel in a sub-scanning direction is a color pixel, and
   wherein the color-pixel determination means determines that the color attribute of the noticed pixel is a single color pixel responsive to the color-pixel determination means determining that the corresponding pixel is not a color pixel.

7. The image processing apparatus according to claim 6, wherein the storage means comprises:
   line maintaining means for maintaining a color attribute for each pixel for a predetermined line of the image; and
   window storage means for storing, in a window format, the color attribute for each pixel for the predetermined line maintained by the line maintaining means and the color attribute for each pixel for a next line relative to the predetermined line in the sub-scanning direction.

8. The image processing apparatus according to claim 7, wherein the window storage means comprises:
   first window storage means for storing a color attribute for each pixel in a first window format including M pixels in the main scanning direction and two pixels in the sub-scanning direction; and
   second window storage means for storing a color attribute for each pixel in a second window format including N pixels in the main scanning direction and two pixels in the sub-scanning direction.

9. The image processing apparatus according to claim 8, wherein the first counting means comprises:
   first array-attribute counting means for obtaining a number of first array attributes by counting in the first window storage means a number of windows in which the noticed pixel is a color pixel and at least one black pixel is adjacent to the noticed pixel for each of the second blocks;

second array-attribute counting means for obtaining a number of second array attributes by counting in the second window storage means a number of windows in which the color pixels are disposed consecutively in a longitudinal direction in a window area including end pixels, and in which a black pixel is not disposed in the window area for each of the second blocks;

third array-attribute counting means for obtaining a number of third array attributes by counting in the second window storage means a number of windows in which there are consecutive color pixels in a window area including I pixels in the main scanning direction and two pixels in the sub-scanning direction for each of the second blocks; and fourth array-attribute counting means for obtaining a number of fourth array attributes by counting in the first window storage means a number of windows in which the noticed pixel is a color pixel without surrounding black pixels for each of the second blocks.

10. The image processing apparatus according to claim 9, wherein the second counting means comprises fifth array-attribute counting means for obtaining a black-pixel count value by counting pixels determined to be a black pixel by the black-pixel determination means for each of the second blocks.

11. The image processing apparatus according to claim 9, wherein the second counting means comprises:

first calculation means for obtaining a first parameter by calculating a ratio of the number of first array attributes to the number of second array attributes; and second calculation means for obtaining a second parameter by calculating a ratio of the number of fourth array attributes to the black-pixel count value.

12. The image processing apparatus according to claim 11, wherein the block-attribute determination means determines the image attribute of the first block by comparing the countings by the first counting means and the second counting means, and the first parameter and the second parameter counted by the first and second calculation means with predetermined threshold values, respectively.

13. The image processing apparatus according to claim 2, wherein the line-group image attribute determination means determines whether or not the image attribute of the first line group is monochrome, and wherein the final determination means determines that the pixel attribute of the third line group is monochrome responsive to the image attribute of the first line group and the image attribute of the second line group being monochrome.

14. The image processing apparatus according to claim 2, wherein the first line group and the second line group have the same number of lines.

15. The image processing apparatus according to claim 14, wherein the third line group has a half the number of lines as that of the first line group.

16. The image processing apparatus according to claim 2, further comprising image processing means for performing on the third line group image processing in accordance with the image attribute of the third line group determined by the final determination means.

17. The image processing apparatus according to claim 2, further comprising image recording means for recording a color multi-valued image for each predetermined line unit, wherein the predetermined line unit has the same number of lines as that of the third line group.

18. The image processing apparatus according to claim 17, wherein the image recording means includes an ink-jet monochrome head and an ink-jet color head, wherein the monochrome head is longer than the color head.

19. An image processing method comprising:

a factor multiplication step of multiplying a first luminance signal for each pixel constituting a color multi-valued image by a factor to obtain a second luminance signal;

a color-attribute determination step of determining a color attribute of the pixel based on the second luminance signal;

a storage step of storing the color attributes determined in the color-attribute determination step for the pixels in a predetermined area including a noticed pixel in a predetermined storage device;

a first counting step of counting an array attribute determined in accordance with an array of the color attributes stored in the storage device for a predetermined number of lines of second blocks in a first block obtained by dividing a first line group in the color multi-valued image in a main scanning direction;

a second counting step of counting the color attributes determined in the color-attribute determination step for the second block;

a parameter calculation step of calculating parameters indicating an image characteristic for the first block based on a count value counted in the first counting step and a count value counted in the second counting step;

a block-attribute determination step of determining an image attribute of the first block based on the count value counted in the first counting step, the count value counted in the second counting step, and the parameters calculated in the calculation step; and a line-group image attribute determination step of determining the image attribute of the first line group based on the determination result in the block-attribute determination step.

20. The image processing method according to claim 19, further comprising:

a final determination step of determining an image attribute of a third line group commonly included in the first line group and the second line group based on the determination result for the first line group in the line-group image attribute determination step and the determination result for the second line group.

21. The image processing apparatus according to claim 20, wherein the color-attribute determination step comprises:

a white-pixel determination step of determining whether or not the pixel is a white pixel;

a black-pixel determination step of determining whether or not the pixel is a black pixel; and a color-pixel determination step of determining whether or not the pixel is a color pixel.

22. The image processing apparatus according to claim 21, wherein the color-pixel determination step includes determining that the pixel is a color pixel responsive to determining that the pixel is neither a white pixel nor a black pixel in the white-pixel determination step and the black-pixel determination step, respectively, wherein the color-pixel determination step includes determining that the color attribute of the noticed pixel is a consecutive color pixel responsive to determining in the color-pixel determination step that the corresponding pixel in the previous line of the line including the color pixel in a sub-scanning direction is a color pixel, and wherein the color-pixel determination step includes determining that the color attribute of the noticed pixel is a single color pixel responsive to determining in the color-pixel determination step that the corresponding pixel in the previous line of the line including the color pixel in a sub-scanning direction is not a color pixel.

23. A computer program "stored in a computer readable medium" which causes a computer to execute the steps comprising:

a factor multiplication step of multiplying a first luminance signal for each pixel constituting a color multi-valued image by a factor to obtain a second luminance signal;

a color-attribute determination step of determining a color attribute of the pixel based on the second luminance signal;

a storage step of storing the color attributes determined in the color-attribute determination step for the pixels in a predetermined area including a noticed pixel in a predetermined storage device;

a first counting step of counting an array attribute determined in accordance with an array of the color attributes stored in the storage device for a predetermined number of lines of second blocks in a first block obtained by dividing a first line group in the color multi-valued image in a main scanning direction;

a second counting step of counting the color attributes determined in the color-attribute determination step for the second block;

a parameter calculation step of calculating parameters indicating an image characteristic for the first block based on a count value counted in the first counting step and a count value counted in the second counting step;

a block-attribute determination step of determining an image attribute of the first block based on the count value counted in the first counting step, the count value counted in the second counting step, and the parameters calculated in the calculation step;

a line-group image attribute determination step of determining the image attribute of the first line group based on the determination result in the block-attribute determination step; and a final determination step of determining an image attribute of a third line group commonly included in the first line group and the second line group based on the determination result for the first line group in the line-group image attribute determination step and the determination result for a predetermined second line group.

* * * * *